(12) United States Patent
Steinbach

(10) Patent No.: US 6,816,588 B1
(45) Date of Patent: Nov. 9, 2004

(54) METHOD FOR SWITCHING TELEPHONE CALLS BETWEEN TWO TELEPHONE NETWORKS USING A CENTRAL CONTROLLER

(75) Inventor: Holger Steinbach, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,543
(22) PCT Filed: Sep. 29, 1999
(86) PCT No.: PCT/DE99/03137
§ 371 (c)(1),
(2), (4) Date: Mar. 30, 2001
(87) PCT Pub. No.: WO00/19740
PCT Pub. Date: Apr. 6, 2000

(30) Foreign Application Priority Data

Sep. 30, 1998 (DE) .......................... 198 45 036

(51) Int. Cl.⁷ ............................. H04M 15/00
(52) U.S. Cl. ................. 379/225; 379/221.01; 379/219; 379/220.01
(58) Field of Search ................. 379/225, 219, 379/220.01, 221.01, 221.02, 114.02, 135

(56) References Cited

FOREIGN PATENT DOCUMENTS

| WO | WO 94/13109 | 6/1994 |
| WO | WO 96/33583 | 10/1996 |
| WO | WO 97/39592 | 10/1997 |
| WO | WO 98/08335 | 2/1998 |

*Primary Examiner*—William J. Deane, Jr.
(74) *Attorney, Agent, or Firm*—Bell, Boyd & Lloyd LLC

(57) ABSTRACT

The invention relates to a method for establishing a telephone connection between subscribers of a first telephone net (P) to subscribers of a second telephone net (T1, T2, T3). A calling private branch exchange (N1, N2) of the first telephone net communicates a subscriber's number to a central control unit (C). Said central control unit determines the private branch exchange (N1, N2) from which the second telephone net is accessed. Subsequently, the connection to the subscriber of the second telephone net is established.

7 Claims, 5 Drawing Sheets

|   | Local Area Code | Day | Time | NSTA | Network | Comments |
|---|---|---|---|---|---|---|
| z1 | 089 | MO,DI,MI,DO,FR | 00:00–23:59 | 722 | 7771 | Munich (first network operator) |
| z2 | 089 | SA,SO | 00:00–23:59 | 722 | 7770 | Munich (second network operator) |
| z3 | 069 | MO,DI,MI,DO,FR | 00:00–23:59 | 522 | 7771 | Frankfurt (first network operator) |
| z4 | 069 | SA,SO | 00:00–23:59 | 522 | 7770 | Frankfurt (second network operator) |
| z5 | 030 | MO,DI,MI,DO,FR | 00:00–23:59 | 322 | 7771 | Berlin (first network operator) |
| z6 | 030 | SA,SO | 00:00–23:59 | 322 | 7770 | Berlin (second network operator) |
|   | s1 | s2 | s3 | s4 | s5 | s6 |

Fig.3

METHOD FOR SWITCHING TELEPHONE CALLS BETWEEN TWO TELEPHONE NETWORKS USING A CENTRAL CONTROLLER

BACKGROUND OF THE INVENTION

1. Field of the Invention

The present invention relates to a method for switching telephone calls from a terminal in a first telephone network to a terminal in a second telephone network.

2. Description of the Prior Art

Private branch exchange systems at different locations within an organization are frequently connected to one another via dedicated lines to form a private network, which forms a first telephone network. This makes it possible for the subscribers to make telephone calls, for example, to one another within the private network without any need to pay charges for an individual call to an operator of a second, preferably public, telephone network.

Private networks allow the costs for exchange calls, that is to say telephone connections from terminals in the private network to terminals in a public telephone network, to be reduced. One service feature for reducing the costs of exchange calls from private networks is also referred to as "Least Cost Routing", or LCR for short. In this case, many of the connections to terminals in the public telephone network can be transmitted via the private network. In addition, the exit to the public telephone network takes place only in the immediate vicinity of a local network to which a called terminal is connected. A further possibility for reducing costs for exchange calls is to dial a network provider who offers good tariffs for call switching.

The international Laid-Open Specification WO 98/08335 A discloses a separate connection control unit for connection of telephone terminals, in which a connecting route to a dialed subscriber, and a suitable network operator, are selected on the basis of cost-optimized connection data, which is calculated from a likewise disclosed data server based on geographic, statistical and tariff data, and is transmitted to a database in the connection control unit.

The International Laid-Open Specification WO 96/33583 A discloses a least cost router, which is connected to the outputs of a private branch exchange system in a private communications network and, in the event of a connection request within the private communications network, passes this connection request back to a specific input of the private branch exchange system.

The International Laid-Open Specification WO 97/39592 A discloses a communications system having a large number of connected private branch exchange systems, which each contain memory devices for holding connection data, together with implementation units, in order to set up an optimum connecting route via private branch exchange systems in the private communications system and/or switching centers in the public communications systems.

The International Laid-Open Specification WO 94/13109 A discloses a communications system having a large number of through-switching devices, in which case the communications system selects a different connecting path depending on the telephone number dialed by a terminal connected to it. The through-switching devices are each arranged in different tariff zones, so that a connection can be selected on the basis of the level of the charges by a network operator.

The service feature LCR is offered by private networks in which all the private branch exchange systems support this service feature. As such upgrading a private network by adding the service feature LCR, in the prior art, requires either the use of additional hardware devices, extensive changes to programs in each private branch exchange system in the private network, or replacement of all the private branch exchange systems which do not support this service feature by private branch exchange systems which do support this service feature. However, known solutions are highly complex, and are thus associated with major costs.

An object of the present invention therefore is to provide a method for switching telephone calls between different telephone networks using the LCR method and at low cost.

SUMMARY OF THE INVENTION

Accordingly, the present invention is based on the idea that the service feature of least cost routing (LCR) can be provided in a first telephone network which contains a number of private branch exchange systems by first of all passing all the connection requests from terminals in the first telephone network to terminals in a second telephone network to a central controller. As soon as the telephone number of a called terminal in the second telephone network is dialed by a calling terminal in the first telephone network, a telephone connection is set up to the central controller. The telephone number is then transmitted to the central controller. The central controller uses the local area code of the dialed telephone number to determine a private branch exchange system from which the transfer to the second telephone network will take place. A telephone connection is then set up to the private branch exchange system which has been determined.

The central controller has a directory, for example in the form of a file, which contains criteria which are taken into account when defining the private branch exchange system from which the first telephone network will be left. As already explained, the local area code is used to determine a private branch exchange system in the immediate vicinity of the destination. A further criterion may be the time of the connection request if particularly good tariffs are offered by different network providers at specific times of day or on specific days of the week.

New or amended tariffs from network providers can be taken into account particularly easily with the method according to the present invention, since only the directory in the central controller is adapted in the event of tariff changes. In telephone networks in which the service feature LCR is supported by all the private branch exchange systems, tariff changes, on the other hand, require adaptations in all the private branch exchange systems.

The present invention allows the service feature LCR to be offered in telephone networks in which the service feature LCR is supported only by the central controller. Private branch exchange systems in telephone networks which do not support this service feature are adapted such that they pass connection requests to subscribers in a second telephone network to the central controller rather than directly to the second telephone network. This adaptation can be carried out with little complexity in the private branch exchange systems. Particularly in telephone networks having relatively old private branch exchange systems, the method according to the present invention avoids the relatively old private branch exchange systems having to be replaced by new private branch exchange systems.

The first telephone network may be, for example, a private network of an organization. As mentioned initially, the private branch exchange systems are typically located at different sites in the organization, and are connected to one another via tielines. The second telephone network may be, for example, a public telephone network, which is operated by a network operator.

In one preferred embodiment, each private branch exchange system is configured such that it sets up a connection to the central controller immediately after an exchange code character has been dialed. The other characters in the telephone number are transmitted to the central controller once they have been dialed by the subscriber. The central controller starts to evaluate the character sequence of the telephone number as soon as the last character has been dialed and transmitted. The time which a subscriber needs to dial the entire character sequence is considerably longer than the time which is required to set up the connection to the central controller and to evaluate the character sequence. The setting up of the connection to the called terminal is thus delayed only slightly.

The method is also suitable for private networks in which the private branch exchange systems have associated code characters. These code numbers are used, for example in conjunction with telephone number directories, for passing on telephone connections within the private network. Each private branch exchange system has a telephone number directory which allocates a cross-connection to a code number, and this cross-connection connects the private branch exchange system to an adjacent private branch exchange system.

In one advantageous development of the method according to the present invention, the code number of the private branch exchange system which has been determined and the character sequence of the dialed telephone number are used to form a new character sequence. The central controller contains a program module for forming the new character sequence. The telephone connection to the second telephone network is set up using the new character sequence. The advantage of this development is that the telephone number directories which already exist in the private branch exchange systems are used for switching the telephone calls. This is advantageous in particular when the respective shortest routes determined from the telephone number directories in the private branch exchange systems are defined between the private branch exchange systems in the private network.

In one preferred embodiment, the central controller is integrated in a private branch exchange system. This embodiment offers the advantage that a telephone connection is set up between the central controller and the private branch extension which is being determined and is used to continue the connection from the calling private branch extension to the central controller. This embodiment is feasible, for example, when the private branch exchange systems in the first telephone network are connected to the central controller in the form of a star.

However, the central controller also may be configured such that it transmits the new character sequence to the calling private branch exchange system. The calling private branch exchange system uses the new character sequence to set up a connection to the private branch exchange system which has been determined, and from which the transfer to the public telephone network takes place. This refinement of the method according to the present invention relieves the load on the central control of having to set up connections to the private branch exchange system which has been determined.

It is particularly advantageous if, in the already described refinement of the method according to the present invention, the connection between the calling private branch exchange system and the central controller is cleared once the new character sequence has been transmitted. This ensures that no superfluous lines between the private branch exchange systems are occupied in the first telephone network.

Additional features and advantages of the present invention are described in, and will be apparent from, the following Detailed Description of the Preferred Embodiments and the Drawings.

DESCRIPTION OF THE DRAWINGS

FIG. 3 shows a directory for switching exchange calls;

DETAILED DESCRIPTION OF THE PREFERRED EMBODIMENTS

Figure 1:
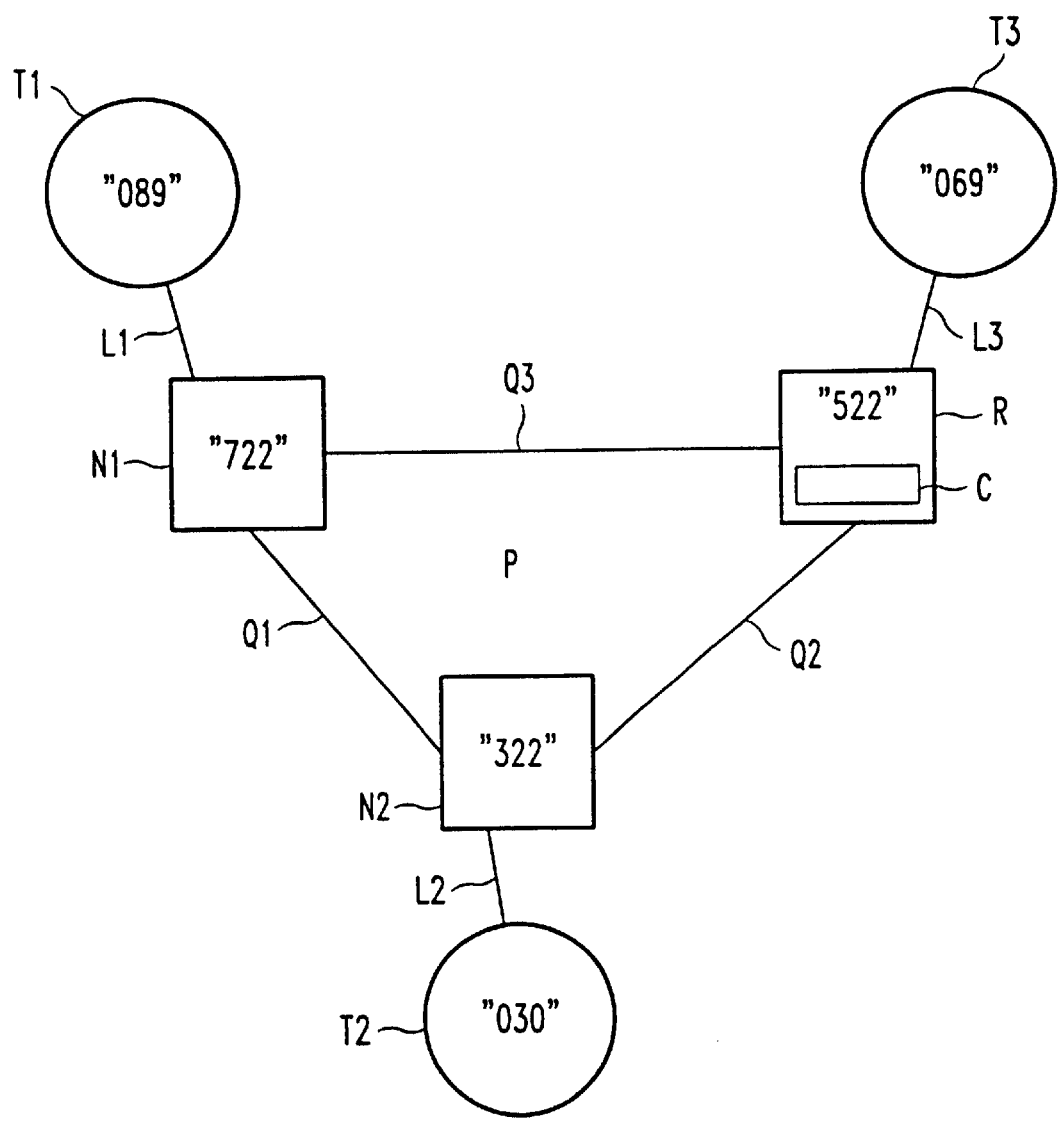
FIG. 1 shows, schematically, the layout of a telephone network.

FIG. 1 shows a number of private branch exchange systems N1, N2 and R in an organization, and which are part of a private network P. The private branch exchange system R has a central controller C which carries out control tasks, and which will be explained further below. The private branch exchange systems N1, N2, R are connected to one another via cross-connections Q1, Q2 and Q3 which, for example, are in the form of tielines. The private branch exchange systems N1, N2, R are connected via groups of lines L1, L2 and L3 to a respective local network T1, T2 and T3, which is operated by a network operator of a public telephone network. The local network T1 has the local area code "089", the local network T2 has the local area code "030" and the local network T3 has the local area code "069".

The private branch exchange systems N1, N2 and R are assigned private branch exchange system code numbers "722", "322" and "522", respectively, which define the number ranges of the terminals connected to the private branch exchange systems. The illustration does not show the extensions connected to the private branch exchange systems N1, N2 and R, the local switching centers associated with the local networks T1, T2, T3, terminals and lines between these terminals, or the local switching centers.

Telephone connections from subscribers in the private network P to subscribers in the public telephone network are set up in two phases. In a first phase, a calling private branch exchange system N1, N2 sets up a connection to the private branch exchange system R to which it transfers a dialed character sequence for the subscriber in the public telephone network. The central controller C in the private branch exchange system R uses this character sequence to determine the private branch exchange system N1, N2, R from which the transfer to the public telephone network will take place. In this case, the private branch exchange system N1, N2, R which is chosen is that which is in the immediate vicinity of a destination, that is to say the local network T1, T2, T3 to which a calling terminal is connected. In a second phase of setting up the connection, the connection is set up to this private branch exchange system N1, N2, R which has been determined, and from which the transfer to the public telephone network will take place.

Figure 2:
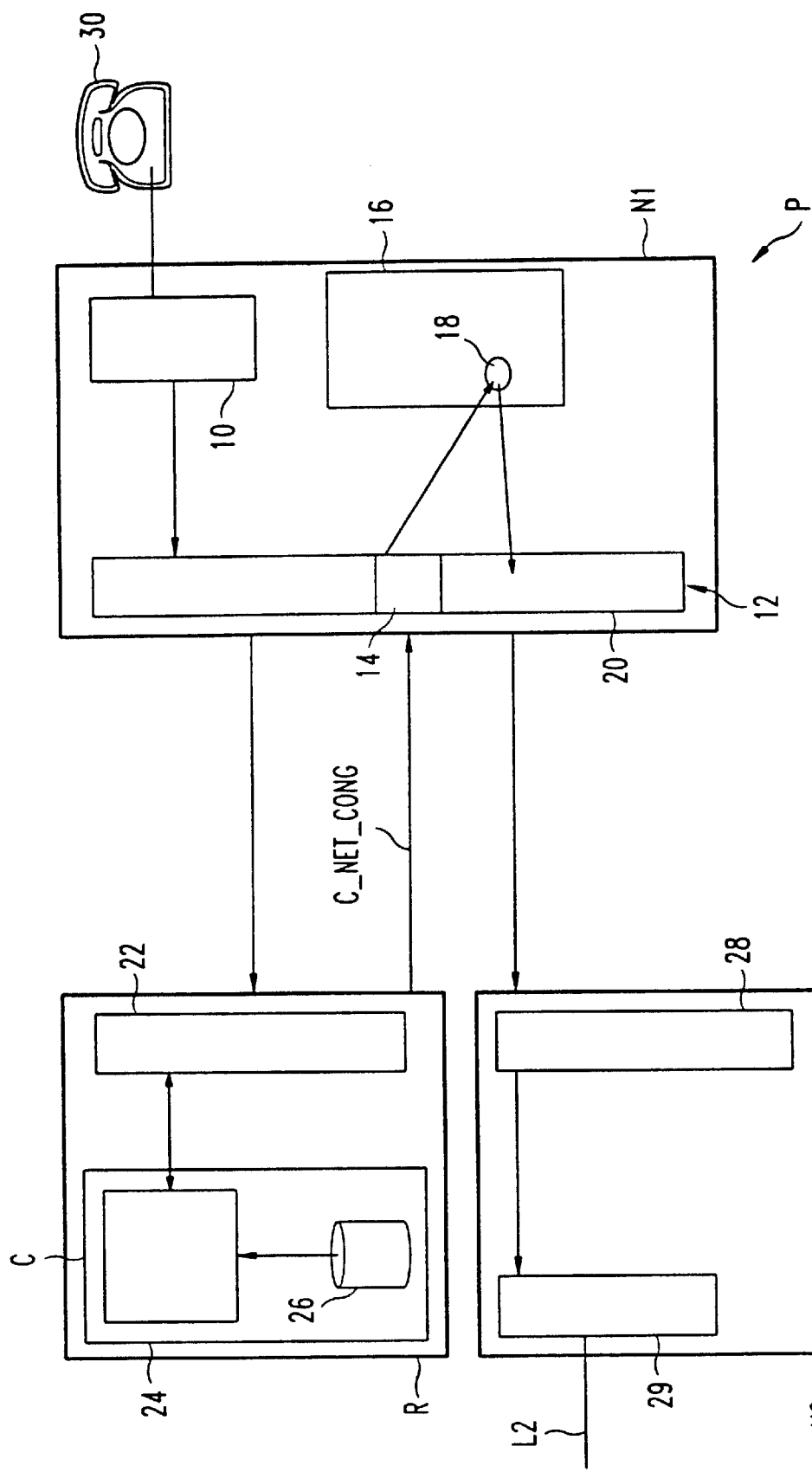
FIG. 2 shows, schematically, the layout of the private branch exchange systems.

FIG. 2 shows elements 10 to 29 of the private branch exchange systems N1, N2, R which are required for a connection to the local network T2 from a terminal 30 which is connected to the private branch exchange system N1. The private branch exchange system N1 contains a subscriber switching module 10 which evaluates the telephone number transmitted from the terminal 30 and sets up connections to other extensions, which are not illustrated here but which are connected to the private branch exchange system N1, or causes a switching module 12 to set up connections to the other private branch exchange systems N2, R. The private branch exchange system N1 is connected to the cross-connections Q1, Q3 and to the group of lines N1 via the switching module 12. Furthermore, the private branch exchange system N1 contains a dialing memory 16, which is used to temporarily store the telephone numbers dialed by the subscribers in the private branch exchange system N1.

A router 20 determines a connecting route through the private network P from the private branch exchange system N1 to the private branch exchange system N2, R. If no connection is set up via a first connecting route, for example because the cross-connection Q1, Q2, Q3 via which this connecting route passes is busy, then the router 20 defines another connecting route. A message "C_NET_CONG" is used to tell the calling private branch exchange system N1, N2, R that no connection has been made to a called private branch exchange system N1, N2, R. The router 20 is called by the switching module 12 once the message "C_NET_CONG" has been received.

Once a subscriber has dialed an exchange code character on the terminal 30, the subscriber switching module 10 causes the switching module 12 to set up a telephone connection via the cross-connection Q3 to the private branch exchange system R. The private branch exchange system R has a switching module 22, via which the private branch exchange system R is connected to the cross-connections Q2 and Q3 and to the group of lines L3. The private branch exchange system R also has a central controller C. This contains a least cost routing program module 24, an LCR module 24 for short, for evaluating and processing a telephone number which is assigned to a subscriber in the public telephone network, and a directory 26 with information for the transfer to the public telephone network.

The connection to the private branch exchange system R is set up immediately after dialing the exchange code characters. Each further character is transmitted directly to the private branch exchange system R, that is to say immediately after it has been dialed.

Once the last character has been dialed and has been transmitted to the private branch exchange system R, the LCR module 24 evaluates the dialed character sequence. The LCR module 24 uses the directory 26 to determine the private branch exchange system code number of that private branch exchange system N1, N2, R from which the transfer to the public telephone network will be made. The LCR module 24 replaces the exchange code character in the dialed character sequence by the private branch exchange system code number which has been determined.

This should be clarified by an example: the LCR module 24 uses the dialed character sequence "0 030 123456", which is assigned to a terminal with the telephone number "123456" in the local network T2 with the local area code "030", to form the processed character sequence "322 030 123456". In this case, the private branch exchange system code number "322" refers to the private branch exchange system N2, which is connected to the local network T2 via the group of lines L2.

After processing the character sequence, the LCR module 24 defines the connecting route via which the connection will be set up to the private branch exchange system N2 which has been determined. A first route passes via the cross-connection Q1 from the private branch exchange system N1 to the private branch exchange system N2. A second route passes via the cross-connection Q3 to the private branch exchange system R, and from there via the cross-connection Q2 to the private branch exchange system N2. The first route is chosen in this example, in order to relieve the load on the cross-connections Q3 and Q2 to the private branch exchange system R.

The private branch exchange system R transmits the message "C_NET_CONG" and the processed character sequence, for example "322 030 123456", to the calling private branch exchange system N1. After receiving the message "C_NET_CONG" and the processed character sequence, a program function 14 in the switching module 12 inserts the processed character sequence into a memory area 18 in the dialing memory 16. The switching module 12 clears the connection to the private branch exchange system R. The router 20 then reads the character sequence stored in the memory area 18, and sets up a connection to the private branch exchange system which has been determined.

In the example mentioned above of the telephone number "030 123456", a connection to a switching module 28 in the private branch exchange system N2 is set up via the cross-connection Q1 on the basis of the processed character sequence "322 030 123456". The character sequence "322 030 123456" is transmitted to the private branch exchange system N2. After receiving this character sequence, the switching module 28 removes the characters of the private branch exchange system code number "322" from the character sequence "322 030 123456". The switching module 28 uses the local area code "030" to determine that the transmitted character sequence "030 123456" is associated with a terminal in the local network T2. The character sequence "030 123456" is transmitted to an exchange switching module 29, which sets up a connection to the local network T2 via the line L2.

FIG. 3 shows an example of the directory 26. The directory 26 is in the form of a list of data lines z1 to z6 and contains columns s1 to s6 for code variables, Local Area Code (ONKZ), Day (TAG), Time, NSTA, and NETZ, which will be explained in the following text, and comments.

The LCR module 24 in the central controller C uses the directory 26 to determine the private branch exchange system code number NSTA and a network code number NETZ for a telephone number of a called terminal in the public telephone network. The network code number NETZ defines a network operator, in this example the public telephone network, via which the telephone connection is set up from the private network P to the local network T1, T2, T3.

The value of the code variable local area code in the first column s1 defines the local area code of the telephone number of the called subscriber, for example "089" for the local network T1 to which the private branch exchange system N1 is connected via the group of lines L1. The code variable TAG in the second column refers to a character sequence which defines a list of days of the week. The code variable Time in column s3 refers to a character sequence which defines a time of day.

The fourth column s4 contains, for each data line z1 to z6, the private branch exchange system code number NSTA, which defines a private branch exchange system N1, N2, R via which the transfer to the public telephone network will be made. The fifth column s5 contains, for each data line z1 to z6, the network code number NETZ which tells the network operator that his telephone network is being used. Finally, the sixth column contains explanatory text for each data line z1 to z6. In the data line z1, the text "Munich (first network operator)" indicates that the data line z1 defines connection routes to the Munich local network, that is to say to the local network T1, via the telephone network of a first network operator.

For connections to the local network T1 with the Local Area Code ONKZ=089 and which are set up from Monday to Friday, that is to say DAY=MO, TU, WE, TH, FR, the data line z1 defines the private branch exchange system N1 with the private branch exchange system code number NSTA=722 for leaving the exchange. For the network code number NETZ, the data line z1 defines the value "7771" of the first network operator. For telephone calls to subscribers in the local network T1 and which are made on a Saturday or Sunday, the data line z2 defines the value "722" for the private branch exchange system code number NSTA, and the value "7770" of a second network operator for the network code number NETZ.

The data lines z3 and z4 define values for the private branch exchange system code number NSTA and the network code number NETZ for connections to subscribers in the local network T3. The data lines z5 and z6 define values for the code variables NSTA and NETZ for telephone calls to the local network T2 with the local area code "030".

Figure 4:
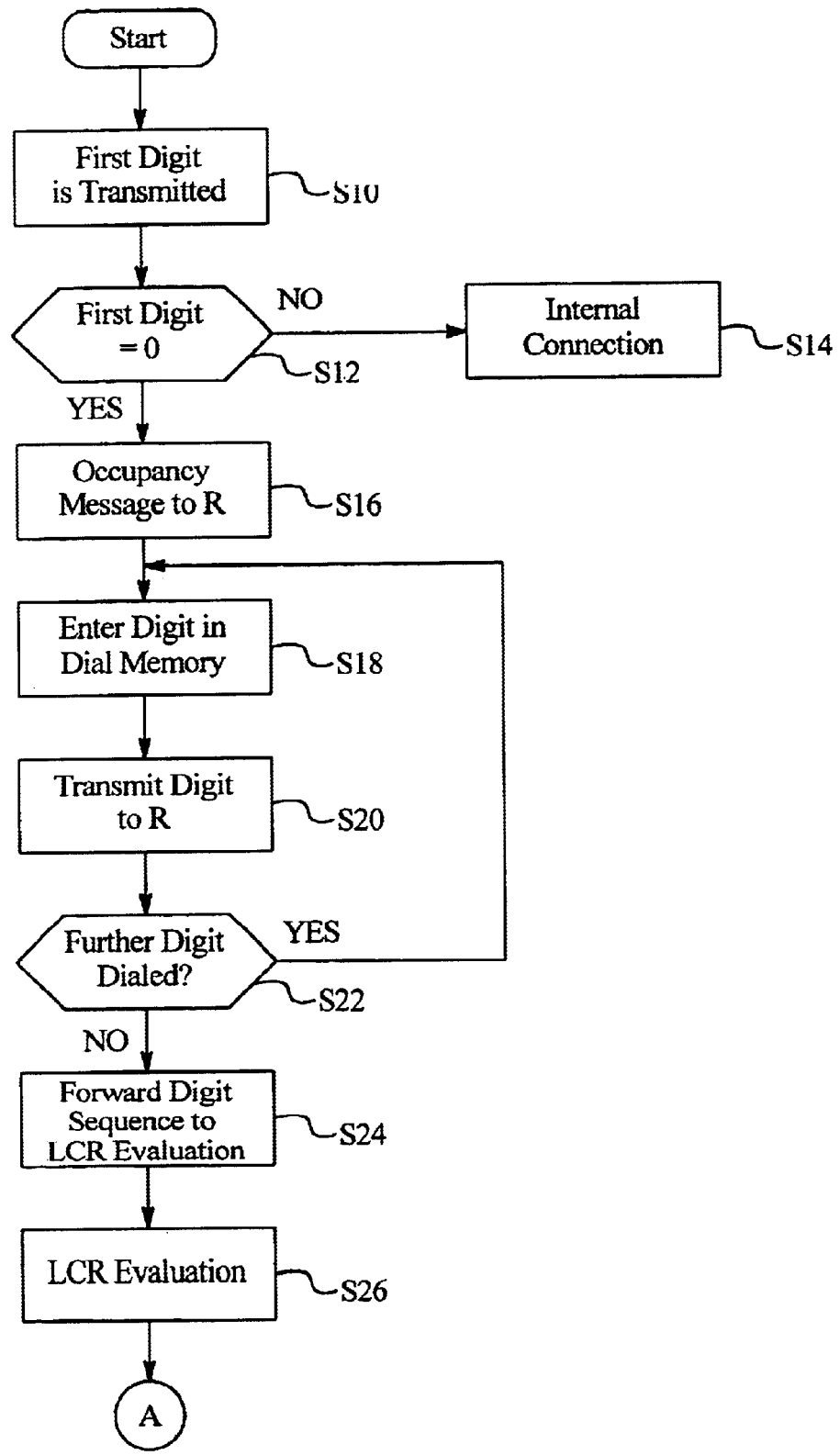
FIG. 4 shows the method steps for setting up a connection as far as evaluation of a dialed character sequence.

The method sequence will be explained in more detail with reference to FIGS. 4 and 5, using a flowchart. FIG. 4 shows the method steps S10 to S26 as far as evaluation of the dialed character sequence by the LCR module 24 in the private branch exchange system R. In the method step S10, the character dialed on the terminal 30 by a subscriber in the private network P is transmitted to the subscriber switching module 10. In the decision block S12, the subscriber switching module 10 checks whether the dialed digit is an exchange code character. In this example, "0" is an exchange code character. A connection to a further terminal in the private network P is set up, in step S14, in the no branch. In the yes branch, the subscriber switching module 10 causes the switching module 12 to set up a connection to the private branch exchange system R.

In the sequence step S16, the switching module 12 sets up a connection to the private branch exchange system R via the cross-connection Q3. The dialed character is first of all entered in the dialing memory 16 in step S18, and is transmitted to the private branch exchange system R in step S20. The subscriber switching module 10 then checks whether any further character has been dialed (decision block S22). If this is the case, then the process jumps back to step S18. In the no branch of the decision block S22, the switching module 22 in the private branch exchange system R transmits the dialed character sequence to the LCR module 24 (step S24).

The dialed character sequence is processed in method step S26. The local area code of the called terminal is determined first of all and, taking account of the day of the week and time of day, the appropriate data line z1 to z6 in the directory 26 is selected. Assuming the character sequence "0030123456" has been dialed at 10.00 hrs on a Wednesday, then the LCR module 24 selects the data line z5 from the directory 26. This results in the value "322" for the private branch exchange system code number NSTA, and the value "7771" for the network code number. The modified character sequence "322 7771 030 123456" is transmitted to the switching module 22.

Figure 5:
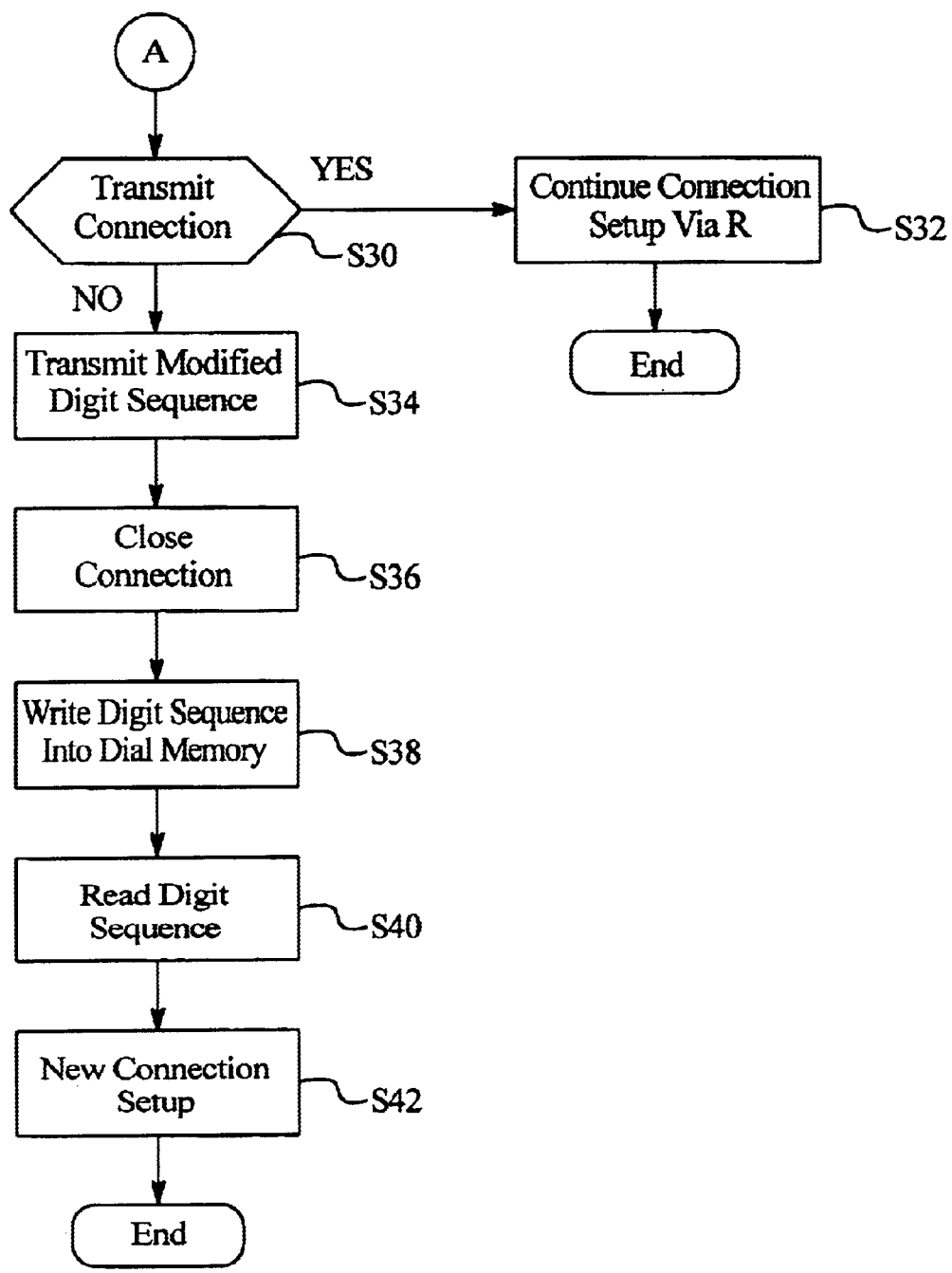
FIG. 5 shows the continuation of the process of setting up a connection.

FIG. 5 shows the method steps S30 to S42, via which the setting up of a connection is continued. The switching module 22 in the private branch exchange system R decides, in the decision block S30, whether a telephone connection is being set up from the private branch exchange system R to the private branch exchange system N1, N2 from where the transfer to the public telephone network will take place. In the yes branch of the decision block S30, the switching module 22 in the private branch exchange system R sets up a connection to that private branch exchange system N1, N2, R whose private branch exchange system code number has been determined by the LCR module 24 (step S32).

In the no branch of the decision block S30, the private branch exchange system R transmits the modified character sequence, for example "322 7771 030 123456", to a calling private branch exchange system N1, N2 from which the telephone connection to the private branch exchange system R has been set up (step S34). The switching module 22 in the private branch exchange system R sends the message "C_NET_CONG" to the calling private branch exchange system N1, N2. Once the switching module 12 in the calling private branch exchange system N1, N2 has received the message "C_NET_CONG", it closes the telephone connection to the private branch exchange system R in the method step S36.

The program function 14 writes the modified character sequence to the memory area 18 of the memory 16 (step S38). Furthermore, on the basis of the message "C_NET_CONG", the modified character sequence is then read from the memory area 18 of the dialing memory 16 by the router 20 in the calling private branch exchange system N1, N2 in the step S40. The router 20 then sets up a connection to the public telephone network via the private branch exchange system N1, N2, R, using the private branch exchange system code number which has been determined.

Although the present invention has been described with reference to specific embodiments, those of skill in the art will recognize that changes may be made thereto without departing from the spirit and scope of the invention as set forth in the hereafter appended claims.

What is claimed is:

1. A method for switching calls from a first terminal in a first telephone network to a second terminal in a second telephone network, wherein the first telephone network includes a plurality of private branch exchange systems, and a portion of the plurality of private branch exchange systems have access to the second telephone network, the method comprising the steps of:

providing one of the plurality of private branch exchange systems with both an LCR module and directory, wherein, for the plurality of private branch exchange systems and depending on a called local area code, the directory identifies a transferring private branch exchange system in which a transfer to the second telephone network will occur;

setting up a telephone connection from a calling one of the plurality of private branch exchange systems to the private branch exchange system which contains the LCR module;

transmitting a character sequence of a dialed telephone number, which is associated with the second terminal in the second telephone network, to the LCR module;

determining the transferring private branch exchange system, using the directory, in which the transfer to the second telephone network will occur; and setting up a telephone connection from the first terminal in the first telephone network to the second terminal in the second telephone network via the transferring private branch exchange system which has been determined.

2. A method for switching calls from a first terminal in a first telephone network to a second terminal in a second telephone network as claimed in claim 1, wherein the first telephone network is a private network and the second telephone network is a public telephone network.

3. A method for switching calls from a first terminal in a first telephone network to a second terminal in a second telephone network as claimed in claim 1, wherein the LCR module is integrated in a computer.

4. A method for switching calls from a first terminal in a first telephone network to a second terminal in a second telephone network as claimed in claim 1, the method further comprising the steps of:

associating a code number with each of the plurality of private branch exchange systems;

using both the character sequence of the dialed telephone number and the code number of an identified private branch exchange system, by the LCR module, to form a new character sequence; and using the new character sequence in the step of setting up the telephone connection from the first terminal in the first telephone network to the second terminal in the second telephone network.

5. A method for switching calls from a first terminal in a first telephone network to a second terminal in a second telephone network as claimed in claim 4, the method further comprising the step of:

transmitting, via the LCR module, the new character sequence to the calling private branch exchange system.

6. A method for switching calls from a first terminal in a first telephone network to a second terminal in a second telephone network as claimed in claim 5, the method further comprising the step of:

clearing the telephone connection between the calling private branch 5 exchange system and the LCR module after transmitting the new character sequence.

7. A method for switching calls from a first terminal in a first telephone network to a second terminal in a second telephone network as claimed in claim 1, wherein the directory includes a plurality of data lines, each of the plurality of data lines containing at least one code variable ONKZ and a code variable NSTA, wherein the at least one code variable ONKZ defines a local area code of a call and wherein the code variable NSTA defines the code number of a private branch exchange system in the first telephone network.

* * * * *